United States Patent [19]

Brown

[11] Patent Number: 4,509,378

[45] Date of Patent: Apr. 9, 1985

[54] RECIPROCATING MACHINES WITH BOTH PRIMARY AND SECONDARY COUNTER ROTATING BALANCERS

[76] Inventor: Arthur E. Brown, R.D. 1, Box 1107, Lake George, N.Y. 12845

[21] Appl. No.: 468,139

[22] Filed: Feb. 22, 1983

[51] Int. Cl.³ .................. F16F 15/26; F16H 21/22; F16C 3/04

[52] U.S. Cl. .................................. 74/44; 74/591; 74/603; 123/192 B

[58] Field of Search ............ 74/44, 591, 590, 589, 74/603; 123/192 B

[56] References Cited

U.S. PATENT DOCUMENTS

| | | | |
|---|---|---|---|
| 1,163,832 | 12/1915 | Lanchester | 123/55 R |
| 1,205,895 | 11/1916 | Hoyt | 123/192 B |
| 1,898,459 | 2/1933 | Newcomb | 123/192 B |
| 2,963,854 | 12/1960 | Meijer | 74/44 |
| 3,109,417 | 11/1963 | Bekkala et al. | 123/192 B |
| 3,402,707 | 9/1968 | Heron | 74/604 |
| 3,763,716 | 10/1973 | Blomberg | 123/192 B |
| 4,290,395 | 9/1981 | Sakano et al. | 123/192 B |

FOREIGN PATENT DOCUMENTS

| | | | |
|---|---|---|---|
| 636227 | 2/1962 | Canada | 123/192 B |
| 637117 | 2/1962 | Canada | 123/192 B |
| 217244 | 2/1901 | Fed. Rep. of Germany | 123/192 B |
| 1196012 | 7/1965 | Fed. Rep. of Germany | 123/192 B |
| 1426086 | 12/1968 | Fed. Rep. of Germany | 123/192 B |
| 2757332 | 5/1979 | Fed. Rep. of Germany | 123/192 B |
| 844071 | 10/1960 | United Kingdom | 123/192 B |
| 1210249 | 10/1970 | United Kingdom | 123/192 B |

Primary Examiner—Allan D. Herrmann

[57] ABSTRACT

This invention is best suited for counterbalancing a *single* reciprocating (recip) member (such as a piston). A con rod interconnects a rotary crankshaft to a recip member. Two main counterweights are attached to the crankshaft and rotate therewith. Two coaxial contraweights rotate in the opposite direction from the crankshaft and at the same RPM as the crankshaft. The two main counterweights plus the two contraweights combine forces so as to balance the primary recip inertia forces. Two secondary weights are mounted on two parallel countershafts and they rotate at twice crankshaft RPM and in opposite directions from each other so as to balance the secondary recip inertia forces.

A positive toothed driving means (such as gearing) is used to drive the two said countershafts from the crankshaft. The same gearing plus the two said countershafts are also used to assist in driving the two said contraweights so as to minimize the total number of shafts, bearings, and gears.

So as to further cut down on the number of gears and cost, two of the drive gears are extra wide; they mesh in two separate planes; and thus perform a double function.

In one species, the said two contraweights are attached to a single hollow shaft which surrounds the main shaft of the crankshaft.

The said secondary weights have a large L/D so as to reduce their flywheel effect for a given static moment.

7 Claims, 16 Drawing Figures

RECIPROCATING MACHINES WITH BOTH PRIMARY AND SECONDARY COUNTER ROTATING BALANCERS

INTRODUCTION

Figure 1:
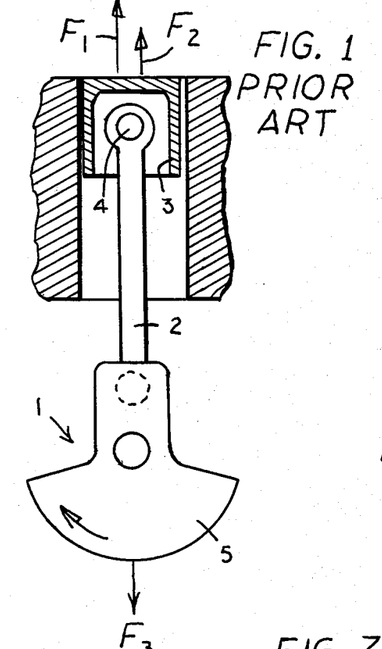
FIGS. 1 and 2 are diagrams which illustrate unbalance in a conventional single cylinder prior art machine.
Figure 2:
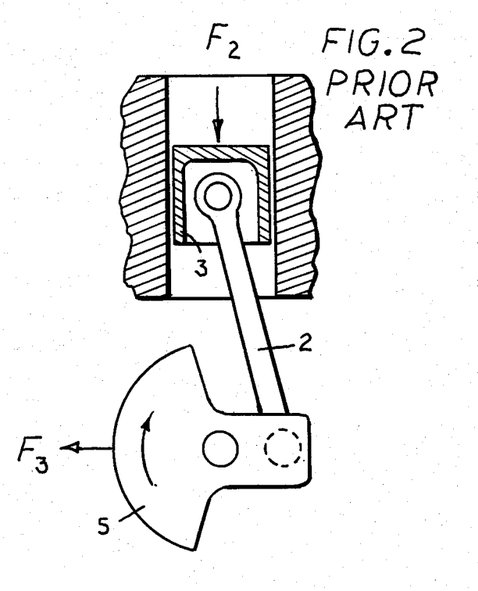

A basic problem with *single* cylinder recip machines is that there are unbalanced shaking forces as illustrated in FIGS. 1 and 2; and (for purposes of balancing) this has been a reason why multicylinder machines have sometimes been used where a single cylinder machine would have otherwise been adequate.

A good application of this invention would be in a large single cylinder double acting compressor machine. In such a machine, the recip parts consist of cross head, piston rod, and piston; and thus the total recip weight gets to be substantial. Such machines have been mounted on large concrete foundations. Even so, the vibration of such a machine can be felt at some distance—in some cases the whole factory building has been set in vibration.

Another application for this invention would be in a large single cylinder engine—steam, gas, or Diesel.

The following formula is for the acceleration of a piston in a crank-connecting rod mechanism. This formula can be found in most text books on the kinematics of machinery:

$$\text{acceleration} = r\omega^2(\cos\theta + \cos 2\theta/N)$$

where
accelleration = inches per second per second
r = crank radius or throw-inches
$\omega$ = rotational speed—radians per second
$\theta$ = angle in degrees that the crank arm has advanced from the top dead center position
N = ratio of con rod length to crank throw.

The well known formula relating inertia force and acceleration is:

$$\text{recip inertia force} = \text{weight} \times \text{acceleration}/\text{gravity}$$

Referring to the first formula, the product $r\omega^2 \cos\theta$ is the primary acceleration; and the product $r\omega^2 \cos 2\theta/N$ is the secondary acceleration.

Thus, if the length of the con rod is for example four times the crank radius, then the secondary inertia force would be one fourth of the primary—still a formidable amount in a big machine. Thus it is desirable to balance the secondary recip forces as well as the primary.

DISCUSSION OF PRIOR ART

F. W. Lanchester in U.S. Pat. No. 1,163,832 taught the use of two weights rotating at twice crankshaft speed (and in opposite directions of rotation from each other) so as to counterbalance *secondary* reciprocating inertia forces. His invention became known as the "Lanchester Balancer".

Referring to U.S. Pat. No. 1,163,832, FIGS. 1, 2, 3, 4, 5, 6, 9, 10, and 11 pertain to balancing a four cylinder in-line engine. FIGS. 12 and 13 pertain to balancing a two cylinder 90 degree Vee. There is no mention or showing of counter-rotating *primary* balance weights. So far as I know and prior to this time, the Lanchester Balancer has not been used in combination with a rotary primary balancer, as set forth herein in my invention.

Prior U.S. Pat. No. 3,402,707 (Heron) shows (in FIGS. 1, 2, and 5) a single cylinder engine having a crankshaft and two countershafts 8 and 9 (each with counterweights thereon) driven by gearing; and this balances only the primary recip inertia forces.

In column 7 lines 14 to 19 Heron mentions the addition of a Lanchester Balancer to cancel out secondary unbalance. If a skilled person were to follow that prescription, there would be a crankshaft plus *four* countershafts all interconnected with a very complicated gear system.

OBJECTS OF THIS INVENTION

1. The first object of this invention is to take a machine which has a crankshaft, a con rod, and *one* recip member; and provide counterbalancing for both the primary recip inertia forces and the secondary recip inertia forces.

2. The main object of this invention is to minimize the total number of gears, bearings, and shafts required to do both jobs—that is, to balance both the primary and secondary recip inertia forces. This is accomplished with only two countershafts and six gears in FIG. 9. This is reduced to only two countershafts and four gears in FIG. 13. Such a reduction in the number of parts, simplifies the machines, reduces cost, and makes the whole arrangement practical.

3. Another object is to avoid a gear lock up problem and at the same time reduce the number of gears (and cost) by employing the novel extra wide gears 41 and 42. Each extra wide gear (41 and 42) meshes with other gears in two separate axially spaced planes and thereby does the work and function of two narrower gears—thereby saving cost.

4. Another object is to provide the novel contra weight assembly and bearings 50, 52, 53, 54, 55, 56, and 57 in FIG. 13. This arrangement of parts makes it possible to reduce the number of gears and shafting required to balance the primary recip inertia force.

5. An object and advantage of this invention is that the loads on the gears are small as will be subsequently explained. This reduces the width and cost of the gears and increases life and reliability.

6. Another advantage of this invention is that the machine is compact in overall size because all balancing parts are contained in the crankcase and the size of that crankcase is not much bigger than the crankcase of a non balanced one cylinder machine.

7. Another advantage of this invention is that all the gears are located in side compartments 44–45 and are readily accessable just by removing the cover plates 46–47. Thus, it is not necessary to disassemble the whole drive mechanism (crankshaft, con rod, or piston) just to get to the gears.

8. Another advantage of this invention is that the novel balancing mechanism can be readily applied to existing designs for one cylinder compressors or engines. It is not necessary to completely redesign a machine in order to add the balancing mechanism. For example, the same con rod, crosshead, piston, and cylinder can be used. The crankshaft would change very little.

9. Another object is to reduce the possiblity of a torsional vibration from being set up in the whole system due to spring/mass effects. This object is obtained by making the Lanchester weights 35 and 36 with a large L/D as will be explained.

10. Another object is to make the machine more compact. This objective is facilitated by making the weights 35 and 36 with a large L/D.

11. Another object is to encase the balance weight 62 in a thin wall cylindrical shell so as to reduce the violent splashing of oil in the crankcase.

BRIEF DESCRIPTION OF THE DRAWINGS

FIGS. 3 to 8 are diagrams which illustrate the basic principles of counter-balancing as taught in this invention.

FIG. 9 is a larger and more detailed section view of the first species of this invention. The section is taken as indicated in FIG. 10. FIG. 9 would be the best figure to use in case of publication.

DETAILED DISCUSSION OF FIGS. 1 AND 2 (PRIOR ART)

The parts are: crankshaft 1, connecting rod 2, piston 3, wrist pin 4, and counterweight 5. When the piston 3 is at top dead center (FIG. 1), the primary recip inertia force $F_1$, is maximum and the secondary recip inertia force $F_2$ also is maximum. The counterweight 5 exerts centrifugal force $F_3$ so as to partially counterbalance the two forces $F_1$ and $F_2$.

When the crankshaft has rotated ninety degrees to FIG. 2, the primary recip force of the piston is zero and the secondary recip force $F_2$ is again maximum, is unbalanced and in the direction shown. The counterweight force $F_3$ is now sideways and is unbalanced. Thus, balancing in FIGS. 1 and 2 is only a poor compromise at best.

DETAILED DESCRIPTION OF FIGS. 3 TO 8 (THIS INVENTION)

The various parts in these diagrams are: crankshaft 6, conrod 7, piston 8, crank arms 9, crankpin 10, and main counterweights 11. The crankshaft 6 is mounted for rotation on main bearings 12.

The two weights 13 are journaled on the crankshaft and they rotate in the opposite direction to that of the crankshaft and at the same RPM as the crankshaft by means of gearing not yet shown. Because the weights 13 rotate in the *opposite* direction to that of the crankshaft, they are therefore referred to as CONTRAWEIGHTS.

The two much smaller weights 14 are secondary balance weights or Lanchester balance weights (named after F. W. Lanchester in U.S. Pat. No. 1,163,832) which rotate on parallel counter shafts 15 at twice crankshaft RPM and in opposite directions from each other. The shafts 15 are driven by gearing not yet shown.

In FIGS. 1 through 8, all forces $F_1$ through $F_{10}$ pertain to balancing the primary and secondary recip inertia forces only. Rotating parts (such as the big end of the con rod) can be counterbalanced simply by adding to the main counterweights 5 or 11 and thus (for simplicity) these rotating forces are not shown in the diagrams.

Figure 3:
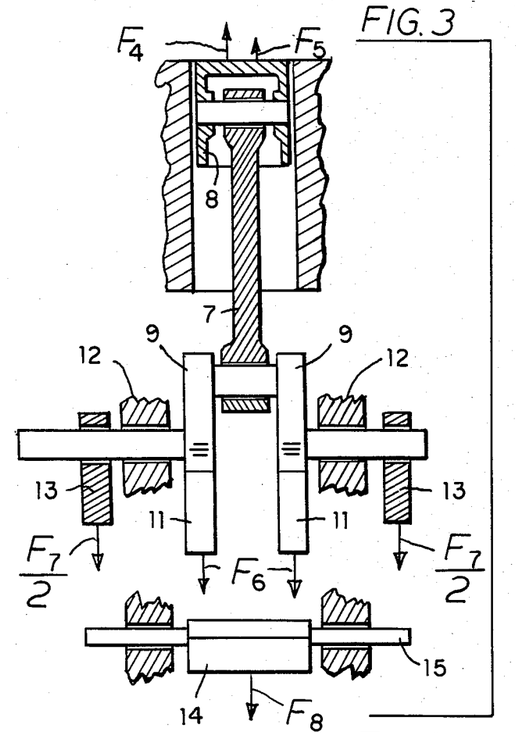
FIG. 3 shows the piston—at top dead center.
Figure 4:
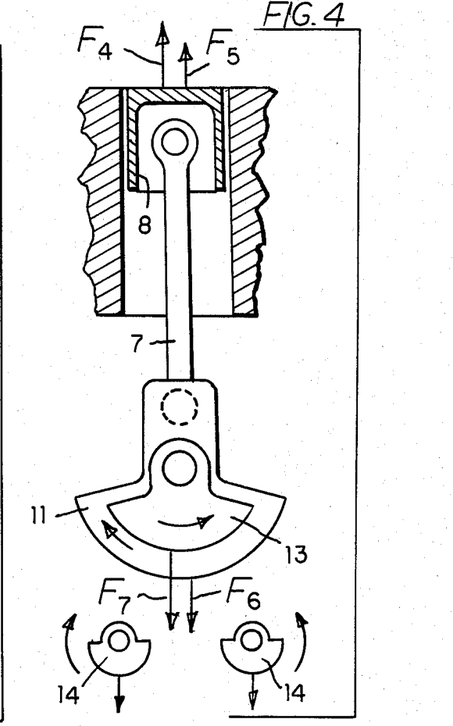
FIG. 4 is a transverse cross section view of FIG. 3.

Referring to FIGS. 3 and 4, the piston is at T.D.C. and exerts maximum primary recip inertia force $F_4$ and maximum secondary recip inertia force $F_5$. The main counterweights 11 exert centrifugal force $F_6$ so as to counterbalance one half the primary recip inertia force $F_4$. The two contraweights 13 exert centrifugal force $F_7$ so as to counterbalance the remaining half of the force $F_4$. In FIGS. 3 and 4, $F_4=F_6+F_7$ and $F_6=F_7$.

The secondary recip inertia force $F_5$ is counterbalanced by the two forces $F_8$ from the two Lanchester balance weights 14.

Figure 5:
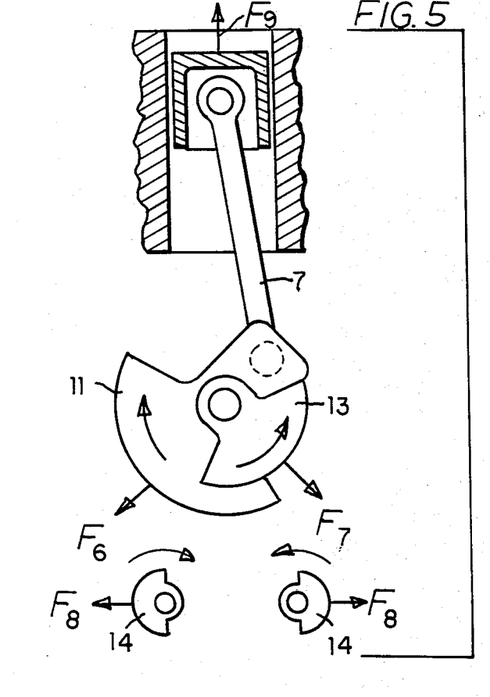
FIGS. 5 to 8 are similar to FIG. 4 except they show successive rotative positions; and in each figure, the crankshaft has advanced 45 degrees from the previous.

Referring next to FIG. 5, the primary recip. inertia force $F_9$ is counter-balanced by the two forces $F_6$ and $F_7$. The secondary recip inertia force is now zero and the two forces $F_8$ cancel each other horizontally.

Figure 6:
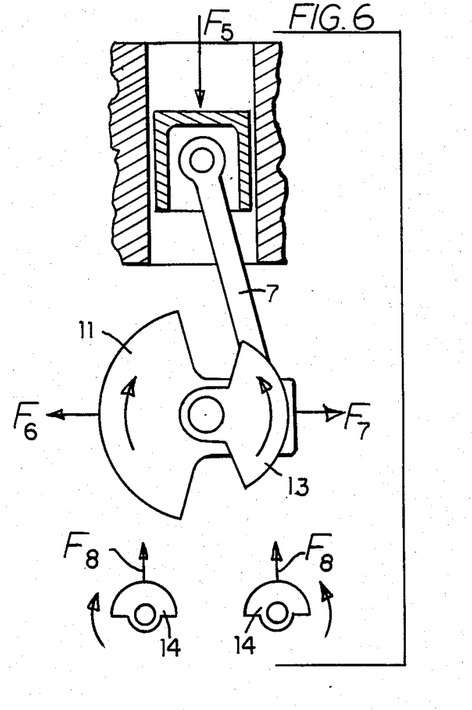

Referring next to FIG. 6, the primary recip inertia force is now zero and forces $F_6$ and $F_7$ balance each other horizontally. The secondary recip inertia force $F_5$ is again maximum and is counterbalanced by the two forces $F_8$.

Figure 7:
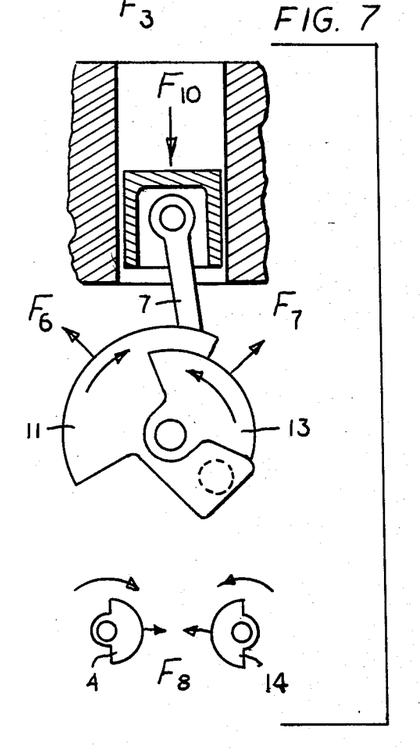

Referring next to FIG. 7, the two forces $F_6$ and $F_7$ combine so as to produce a net vertical force which counterbalances the primary recip inertia force $F_{10}$. The secondary recip inertia force is now zero and the two Lanchester weights 14 cancel each other horizontally.

Figure 8:
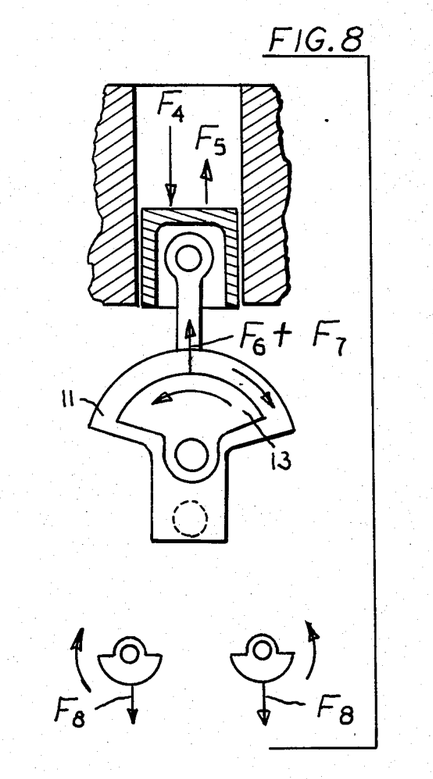

Referring next to FIG. 8, the two forces $F_6$ and $F_7$ combine so as to counterbalance the primary recip inertia force $F_4$. The secondary recip inertia force $F_5$ is counterbalanced by the forces $F_8$ and $F_8$ from the two Lanchester balance weights.

DETAILED DESCRIPTION OF FIGS. 9 TO 12

These Figs. illustrate to one sixth scale the driving parts for an eleven inch stroke, double acting, single cylinder, air compressor. The cross head 16, cross head guide 17, and piston rod 18 are shown, but the cylinder and double acting piston are not shown. The piston is to be attached to rod 18.

The frame structure or crankcase 19 and 20 enclose and support the various working parts. The crankshaft 21 has main shafts 22 and 23, crankarms 24, and crankpin 25. The con rod 26 interconnects the crankpin and crosshead 16 (via wrist pin 27) for respective rotary and reciprocative motion. The two main counterweights (ctwts) 28 are bolted to and rotate with the crankshaft. The crankshaft rotates in the sleeve bearings 29. A combination drive pulley/flywheel 30 is mounted on the crankshaft. The gear wheels 31 and 32 are mounted for opposite rotation on the crankshaft by means of big ball bearings 33. The four weights 34 are fastened one on each side of the gear wheels. Since the weights 34 rotate in a direction opposite from that of the crankshaft, they are referred to as CONTRAWEIGHTS.

Figure 9:
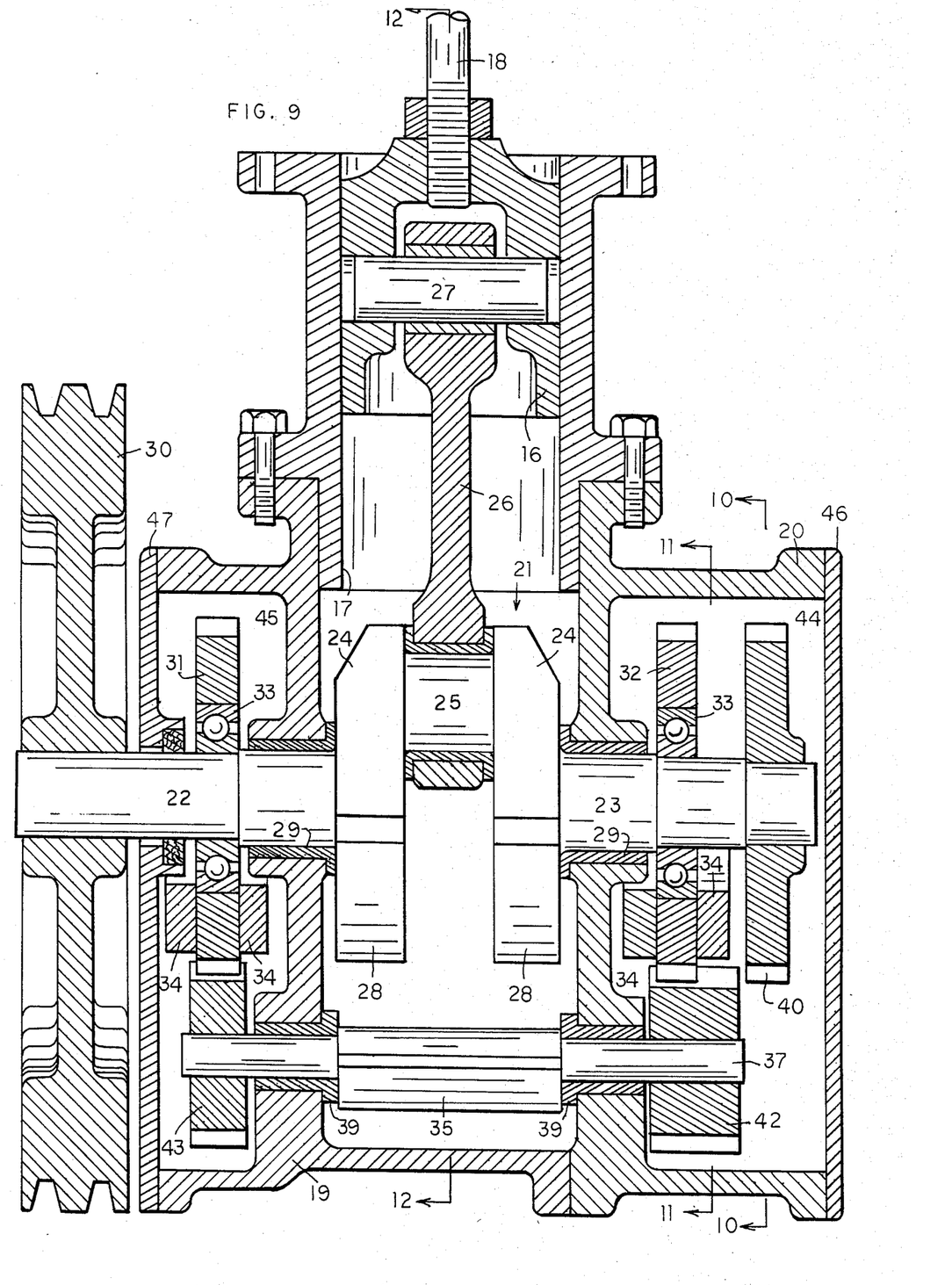
Figure 12:
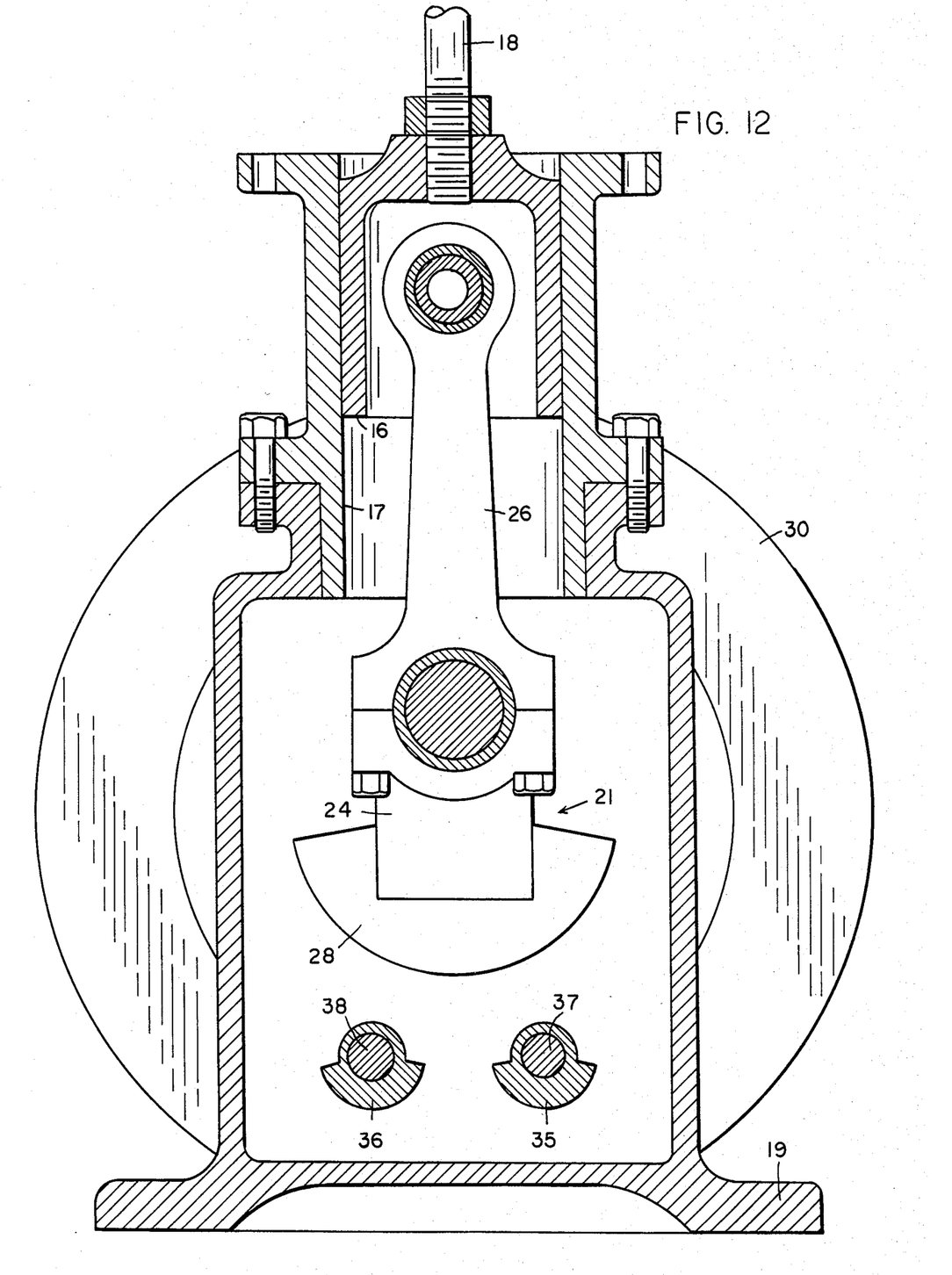

The two Lanchester balance weights 35 and 36 are mounted on shafts 37 and 38 with bearings 39. The two shafts 37 and 38 are parallel to the crankshaft, equidistant from the crankshaft, and also equidistant from the extended centerline of the recip member 16.

Figure 10:
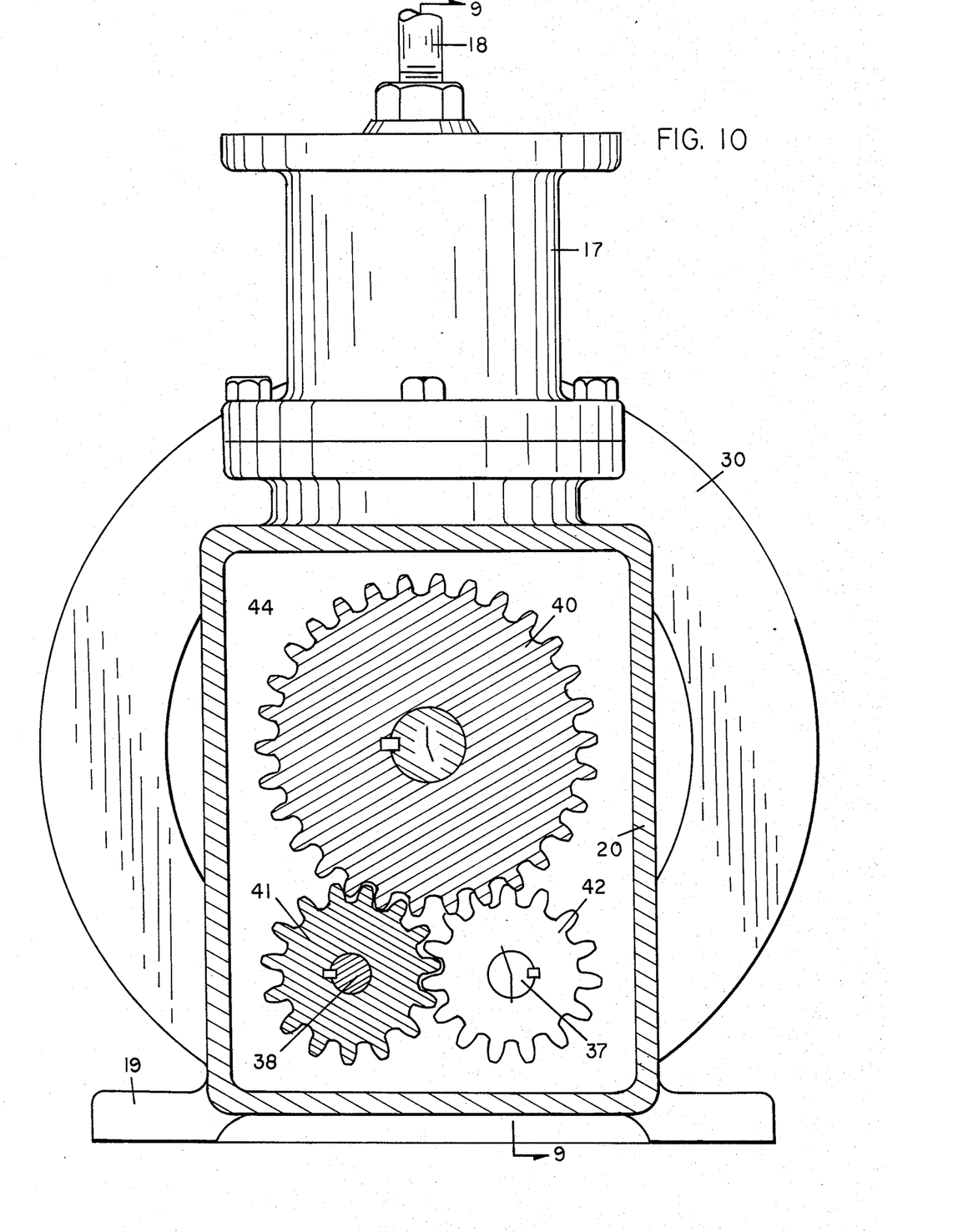
FIGS. 10, 11, and 12 are transverse section views of FIG. 9 taken at the locations indicated.
Figure 11:
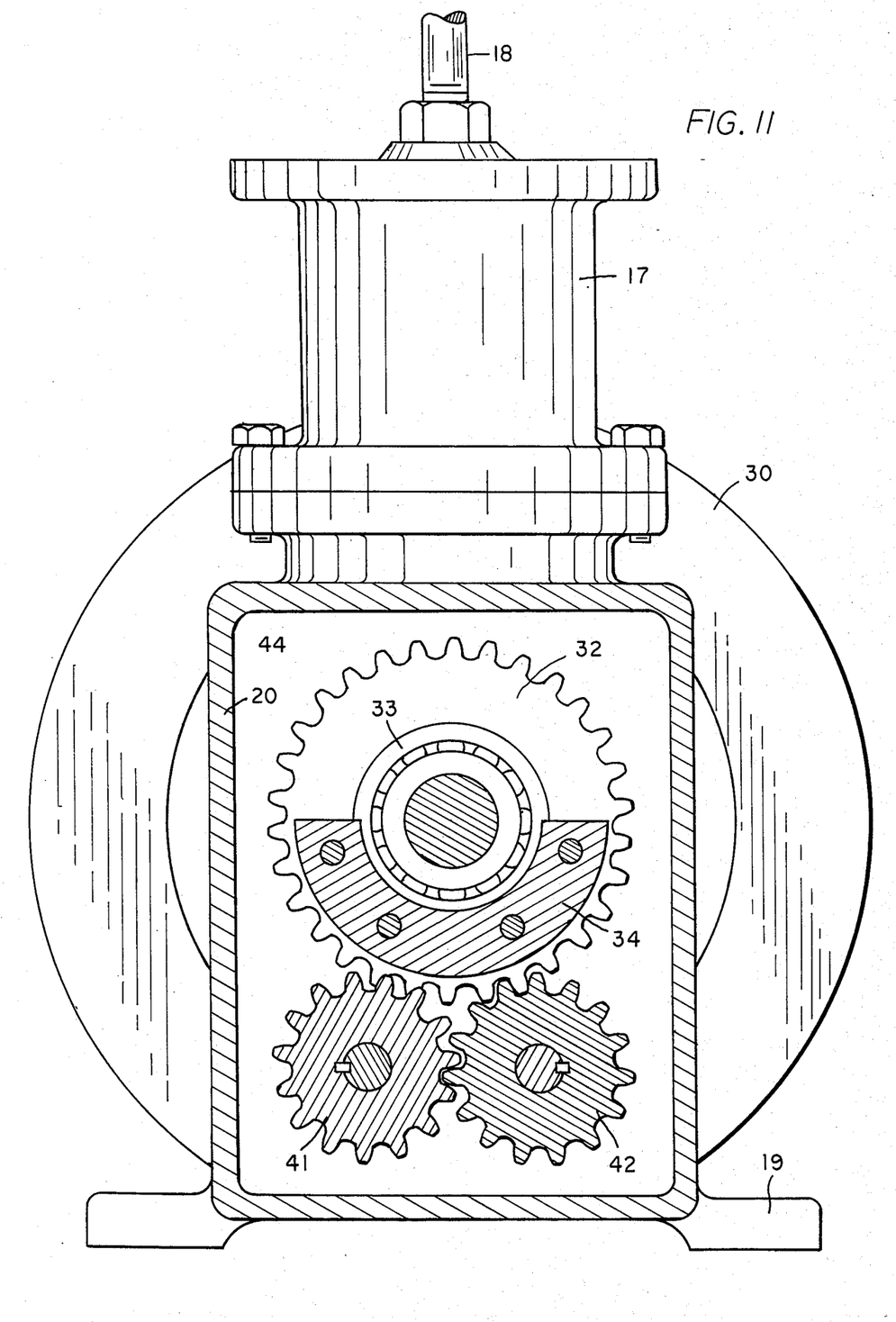

Next, the gearing for driving the contraweights 34 will be described. The gear 40 is keyed to main shaft 23. The gear 40 drives gear 41 which in turn drives gear 42 in a separate plane. Then gear 42 drives gear wheel 32. At the other end of shaft 37 is gear 43 which drives gear 31. Thus the four contraweights 34 are driven at crankshaft speed but in the opposite direction of rotation from that of the crankshaft.

The gears 41, 42, and 43 have pitch diameters one half that of gears 40, 31, and 32. Thus, the two Lanchester weights 35 and 36 are driven at twice crankshaft RPM and in opposite directions of rotation from each other.

It is thus seen that the three gears 40, 41, and 42 perform two functions which are: (1) they drive the two Lanchester weights in opposite directions from each other at twice crankshaft RPM and (2) they drive the gear 32 and contraweights 34 in the opposite direction of rotation from that of the crankshaft and at the same RPM as the crankshaft.

The shaft 37 performs two functions which are: (1) it supports and rotates Lanchester weight 35 and (2) it forms a drive shaft for driving gear 43 and gear wheel 31 and its contraweights 34.

Thus, the total amount of gearing, shafting, and bearings to do both jobs (balance both primary and secondary forces) is minimized.

All the gears are contained in side compartments 44 and 45 with cover plates 46 and 47. Thus, the gears are easy to get to.

SIZE OF PRIMARY WEIGHTS FOR FIGS. 9, 10, 11, AND 12

The total reciprocating weight (consisting of piston, piston rod, piston rod nuts, crosshead, and small end of con rod) is 275 lbs for an eleven inch stroke double acting air compressor. The size of all the balancing weights are carefully calculated for complete balancing and drawn to one sixth scale. The two main counterweights 28 and 28 counterbalance one half the reciprocating weight plus all rotating parts such as the crankpin 25 and the big end of the con rod. The contraweights 34 counterbalance the other half of the recip weight.

The following is a calculation to determine the size of the contraweights 34. The recip weight is 275 lbs and crank throw $11/2 = 5.5$ inches. The total primary moment to be balanced is $275 \times 5.5 = 1512.5$ lb inches. Of this, one half will be counterbalanced by the main ctwts. 28 and one half by the contraweights 34. The moment to be balanced by the contraweights 34 is $1512.5/2 = 756.25$ lb inches. There are four contraweights 34, so the static moment of each is $756.25/4 = 189$ lb inches. The four weights 34 are in the form of 180 degree sector rings (FIGS. 9 and 11) and they are calculated for size and drawn to one sixth scale.

THE LANCHESTER BALANCE WEIGHTS IN FIGS. 9 AND 12

The two Lanchester balance weights 35 and 36 are calculated and drawn to one sixth scale so as to counterbalance the secondary recip inertia forces. The size of the two Lanchester weights is calculated as follows:

The Lanchester weights balance only the secondary recip inertia forces and the magnitude of the secondary force is the primary force divided by 4.2 (ratio of con rod length to crank throw). The Lanchester weights rotate at twice crankshaft RPM and therefore their moment can be divided by four since centrifugal force is proportional to RPM squared. There are two Lanchester balance weights and each one does half the job so the moment of each one can be divided by two. The total recip weight is 275 lbs and the crank throw is 5.5 inches. Therefore the primary static moment is $275 \times 5.5 = 1512.5$ lb inches. The static moment of each Lanchester balance weight is $1512.5/4.2 \times 4 \times 2 = 45$ lb inches. Thus, the Lanchester balance weights do not have to be very big compared to the primary balance weights. The Lanchester weights are drawn to one sixth scale in FIGS. 9 and 12. Their calculated outer radius is 2.9 inches and axial length is 12.6 inches. The hub radius is 1.75 inches. The sectors are 160 degrees.

THE LANCHESTER WEIGHTS 35 AND 36 HAVE A LARGE L/D or L/R

The Lanchester Balancer was invented prior to 1914, yet, has not seen much use. One reason may have been a torsional spring/mass vibration due to the fact that they run at twice crankshaft speed through shafting and a speed up gear.

The combination of a large flywheel effect (the unimproved Lanchester weight) driven at twice crankshaft speed via light gearing and small diameter long springy shafts does not seem like a good idea particularly in a one cylinder machine, which does not have a smooth turning effort to start with. The present invention, therefore, sets forth the idea of making the Lanchester weights long (in the axial direction) but small in diameter (or radius) so as to keep the $WR^2$ (flywheel effect) down.

The weights 35 and 36 have an $L/R = 12.6/2.9 = 4.34$. This feature has the following advantages: (1) The $WR^2$ (flywheel effect) is less for a given WR (static moment); and this reduces the tendancy for a spring/mass vibration. (2) The long narrow weights 35 and 36 permit a shorter center distance between shafts 37, 38 and the crankshaft; thus, all the gears can be smaller in diameter and the crankcase smaller in size; (3) A reduction in $WR^2$ (flywheel effect) reduces the load on the gears as will be described under the heading "Low Gear Loads", and (4) there is to be less splashing of oil in the bottom of the crankcase due to the weights 35 and 36 rotating in an oil pool. The gears 41 and 42 are much bigger in diameter than the weights 35 and 36 and thus, the gears 41 and 42 have an easy job of controlling any tendancy for the weights 35 and 36 to undergo torsional vibration.

GEARS 41 AND 42 ARE EXTRA WIDE, PERFORM A DOUBLE FUNCTION, SAVE COST, AND AVOID A GEAR LOCK UP PROBLEM

Referring to FIGS. 9 and 10, if all three gears 40, 41, and 42 were instead all located in a common plane, then such an arrangement would be inoperable as the three gears would lock up and not rotate since each gear must rotate oppositely from its neighbor. Referring next to FIG. 11, if the three gears 41, 42, and 32 were instead all located in a common plane then the same locking problem would again take place. The locking problem is solved by meshing in three separate planes. A conventional way to have done the gearing job would have been to have used four narrower separate gears all fastened individually to their respective shafts 37 and 38. Instead, the novel extra wide gears 41 and 42 are employed as they are less expensive than four individual narrower gears. Thus, the extra wide gears 41 and 42 perform a double function, i.e.—each is in effect two gears in one.

LOW GEAR LOADS

A feature of this invention is that the gear tooth forces on all six gears (31, 32, 40, 41, 42 and 43) are relatively small and therefore the gears can be less expensive to make and the gears will last longer and be more reliable. The following is an explanation as to why the gear tooth forces are small: All weights 34, 35, and 36 have pure rotary motion (as opposed to reciprocating, oscillating, or planatary motion). Since the weights are all mounted for rotation on good bearings, the loads on the gears due to friction are negligable. Therefore, the only loads on the gears are due to cyclic speeding up and slowing down of the whole system.

In a recip machine, (especially when there is only one cylinder) the crankshaft does not rotate at a steady speed (like an electric motor driving a centrifugal pump) but instead undergoes accelerations and decelerations (each rev) as the piston reciprocates. If the flywheel 30 were infinitely large (compared to the rest of the system), then the rotation of the crankshaft would be absolutely steady (with no cyclic accelerations) and the loads on the six gears due to such non accelerations would be zero. However, the $WR^2$ of the flywheel 30 is not infinite. The machine shown in FIG. 9 is the driving part for a large double acting air compressor rated 150 H.P., 150 PSIG, 400 RPM, 11 inch stroke, and drawn one sixth scale. The $WR^2$ of the flywheel 30 plus the $WR^2$ of the crankshaft is calculated to be about 15 times the $WR^2$ of all those parts driven by and through gear 40. This means, therefore, that only one part in sixteen of the total angular acceleration torque applied to the crankshaft must be transmitted by gear 40. The peak tangential tooth force on gear 40 is calculated to be 175 lbs. This force is equivalent to about 11 H.P. if that force were assumed to be constant. The pitch diameter of gear 40 is 19.2 inches so with only a 11 H.P. peak force going through the big gear 40, it has a very easy job to do. In fact, all six gears are very lightly loaded (for the same reason) and they all have an easy job to do. This suggests using low cost gears and the gears shown are wider than necessary.

The flywheel 30 as drawn is not very big as far as flywheels go and could be made wider or bigger in diameter so as to reduce the load on the gears even further. Also, the above does not include the $WR^2$ of an electric drive motor.

In summary, to reduce gear load, increase the $WR^2$ of all parts ahead of (and including) gear 40; and reduce (minimize) the $WR^2$ of all parts driven by gear 40. Those parts driven by gear 40 are 41, 42, 37, 38, 35, 36, 31, 32 43, and 34.

Figure 13:
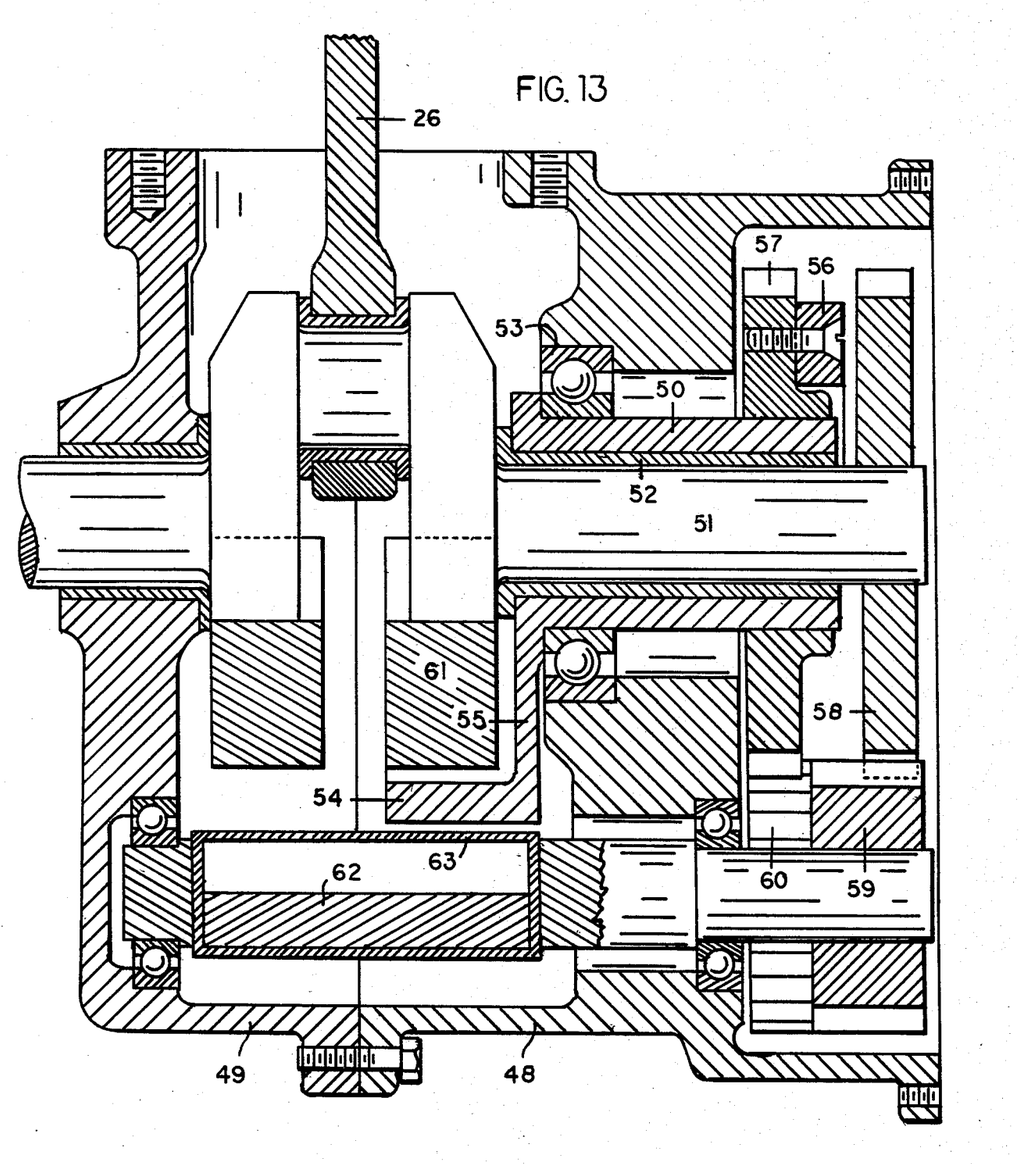
FIG. 13 is a section view of a second species of this invention.

DETAILED DESCRIPTION OF FIG. 13

This Fig. is similar to FIG. 9 except the oppositely rotating primary balance contraweights are located on only one side of the machine (instead of of both sides—as in FIG. 9). Referring to FIG. 13, a frame structure or crankcase 48 and 49 supports and encloses the working parts.

A hollow shaft 50 surrounds the main shaft 51 and a sleeve bearing 52 is interposed. The large ball bearing 53 supports the hollow shaft. A major contraweight 54 is attached to the hollow shaft and rotates therewith. The contraweight 54 is in the form of a 160 degree ring sector joined to the hollow shaft with a flat radial arm 55.

A minor contraweight 56 is attached to the gear wheel 57 which is mounted on and fastened to the hollow shaft. The gear 57 is driven at the same RPM as the crankshaft but in the opposite direction via gears 58, 59, and 60.

The major contraweight 54 is located inboard of the bearing 53 and even overlaps the main counterweight 61 the purpose of which is to place the contraweight 54 as close to the centerline of the recip element (or piston) as possible—so as to minimize the size of the contraweight. The major contraweight 54 and the minor contraweight 56 provide a force couple the net result of which is a force coplanor with the centerline of the piston.

The Lanchester balance weights have the same function as in FIG. 9. In FIG. 13, a total of only four gears is required.

In FIG. 13, the Lanchester balance weight 62 is in the form of a hollow circular cylinder 63 partially filled with a weight material 62. The circular form reduces oil splash in the crankcase.

Figures 14, 15, 16:
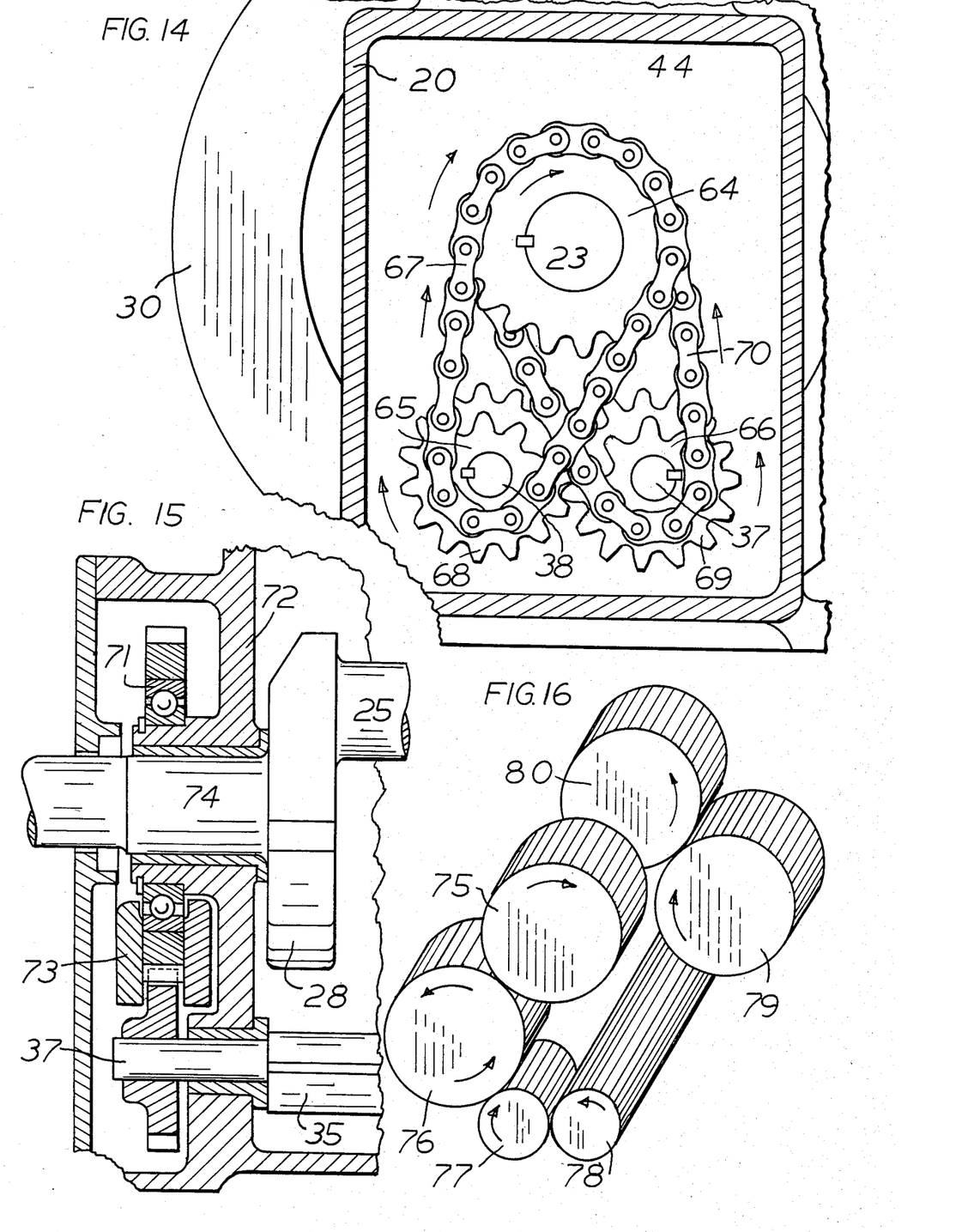
FIG. 14 illustrates an alternate toothed driving means for the machines shown in FIGS. 9 and 13.
FIG. 15 illustrates an alternate bearing arrangement for the machine shown in FIG. 9
FIG. 16 is an isometric schematic view of an alternate gear drive for FIGS. 9 or 13.

DETAILED DESCRIPTION OF FIG. 14

This is an alternate toothed driving means for the machine shown in FIGS. 9 and 13. The sprocket 64 is keyed to the crankshaft 23. The sprockets 65 and 66 are keyed to the two countershafts 37 and 38 upon which are mounted the secondary balance weights. The chain 67 drives shaft 38 at twice crankshaft RPM. The two shafts are geared together with equal size spur gears 68 and 69. The sprocket 66 and chain 70 drives a second larger sprocket (located behind) which drives the contraweights in the opposite direction to the crankshaft and at equal RPM.

DETAILED DESCRIPTION OF FIG. 15

This is similar to FIG. 9 except the large ball bearing 71 is mounted on the frame structure 72 instead of being mounted directly on the crankshaft. For ideal balance, the bearing 71 should be coaxial with the axis of the crankshaft, however, small eccentricities would hardly be noticed. The claims are not to be avoided merely by placing the bearing 71 offset from the axis of the crankshaft. The crankshaft has a main shaft 74. The contraweights 73 rotate around the main shaft 74 even though the bearing 71 does not (in FIG. 15) ride directly on main shaft 74.

DETAILED DESCRIPTION OF FIG. 16

This is an isometric schematic view of an alternate gear drive for FIGS. 9 or 13. The gear 75 is attached to the crankshaft. Idler gear 76 meshes with gears 75 and 77. The small gears 77 and 78 are mounted on the countershafts to which the secondary balance weights are attached. The gear 78 is extra wide and meshes with idler gear 79 in a separate axially spaced plane. Idler gear 79 drives the counter rotating gear 80 to which the contraweights are attached. In the case of a FIG. 9 type construction, a shaft 37 would extend to the opposite side of the machine and a similar three gear set would be used to drive contraweights there.

MODIFICATIONS NOT SHOWN

Referring to FIG. 9, the gear 43 drives gear 31. An alternate way (not shown) would be to remove gear 43, mount a small sprocket on the end of shaft 38, replace gear 31 with a double diameter sprocket and then use a chain or toothed belt for driving the contraweights 34. In a similar manner, the gear 32 could be replaced with a sprocket and then attach a smaller sprocket on shaft 38 and interconnect the two sprockets with a chain or toothed belt. In the several driving methods, this invention teaches the idea of using the countershafts 37 and- /or 38 to perform double duty. That is, the countershafts 37 and 38 support and rotate the secondary balance weights 35 and 36 and at least one of the countershafts also assists in driving the contraweights 34.

REGARDING TORQUE REACTION

Both the primary and the secondary recip inertia forces are balanced. Further, there are no unbalanced force couples. Therefore, the only remaining source of vibration is that due to torque reaction. The crankshaft of a one cylinder machine undergoes angular accelerations and decelerations each rev due to varying gas pressure on the piston, varying inertia forces on the piston, and the variation of torque due to crank position. Such acceleration forces are transmitted to the machine foundation by equal and opposite reaction. A simple prior way to greatly reduce torque reaction to a negligable amount is with a pendulous vibration absorber. This can be done by bolting on the main counterweights with oversize mounting holes (permitting slight angular motion) or a separate pendulous abosrber mounted on the flywheel. These methods and the results are described on pages 287-288 of "The Internal Combustion Engine—Vol II" by C. F. Taylor—the M.I.T. Press.

While the preferred embodiments of the invention have been disclosed, it will be understood that the invention is not limited thereto since it may be otherwise embodied within the scope of the following claims:

I claim:

1. In a reciprocating machine, the combination of a frame structure, a reciprocable member guided for reciprocation relative to said frame structure, a crankshaft mounted for rotation in the frame structure, said crankshaft having a center throw crank with a first main shaft on one side of the crank and a second main shaft on the other side of the crank, said center throw crank having two crank arms and a crankpin, a connecting rod interconnecting said crankpin and said reciprocable member for respective rotary and reciprocative motion, at least one main counterweight attached to said crankshaft and rotatable therewith,
a first countershaft mounted for rotation offset from said crankshaft, a second countershaft mounted for rotation offset from said crankshaft, positive toothed gearing for driving both of said countershafts at twice the RPM of said crankshaft and in opposite directions of rotation from each other, a secondary balance weight mounted on each of said countershafts and rotatable therewith, said two secondary weights serving to counterbalance the secondary reciprocating inertia force of said reciprocable member,
a first contraweight mounted for rotation around said first main shaft, a second contraweight mounted for rotation around said second main shaft, said two contraweights being adapted to both rotate at the same RPM as said crankshaft but in the opposite direction from that of the crankshaft, said main counterweight and said two contraweights combining so as to counterbalance the primary reciprocating inertia force of said reciprocable member, and wherein the improvement comprises:
positive toothed gearing rotatably and directly interconnecting one of said countershafts and said first contraweight such that the countershaft drives the first contraweight with a two to one speed reduction,
positive toothed gearing rotatably and directly interconnecting one of said countershafts and said second contraweight such that the countershaft drives the second contraweight with a two to one speed reduction, and at least one of said countershafts thus serving a multifunction purpose which is to: (a) serve as a shaft for holding and rotating a secondary counterweight and (b) to serve as a transmission for driving one of said contraweights.

2. In a reciprocating machine, the combination of a frame structure, a reciprocable member guided for reciprocation relative to said frame structure a crankshaft mounted for rotation in said frame structure, said crankshaft having a main shaft and a crank arm and a crankpin, a connecting rod interconnecting said crankpin and said reciprocable member for respective rotary and reciprocative motion, at least one main counterweight attached to said crankshaft and rotatable therewith,
a first contraweight mounted for rotation around said main shaft, said contraweight being adapted to rotate in the opposite direction from that of said crankshaft and at equal RPM to that of the crankshaft, said main counter weight and said contraweight serving to counterbalance the reciprocating primary inertia force of said reciprocable member,
a first countershaft mounted for rotation offset from said crankshaft, and wherein the improvement comprises;
a first larger gear attached to said mainshaft and rotatable therewith, pinion gear attached to said first countershaft and rotatable therewith, said first larger gear meshing with said pinion gear so as to drive said first countershaft at twice the RPM of said crankshaft,
a second countershaft mounted for rotation offset from said crankshaft, pinion gear attached to said second countershaft and rotatable therewith,
said pinion gears meshing so as to drive said second countershaft at the same RPM as said first countershaft but in the opposite direction of rotation,
a second larger gear attached to said contraweight and rotatable therewith, said second larger gear meshing with said pinion gear on the second countershaft so as to drive said contraweight at the same RPM as said crankshaft but in the opposite direction of rotation,
a secondary balance weight attached to each of said countershafts and rotatable therewith, said two secondary balance weights serving to counterbalance the secondary reciprocating inertia force of said reciprocable member,
and said two countershafts thus performing multiple functions which are to rotate said secondary weights and also to serve as a transmission and reverser for driving said contraweight in the opposite direction of rotation from that of the crankshaft.

3. The combination specified in claim 1 wherein said contraweight has a larger outer radius than that of said main counterweight, at least a portion of said contraweight overhangs said main counterweight such that both weights rotate in a common plane perpendicular to the axis rotation of the crankshaft, and wherein the purpose of constructing said contraweight as specified being to locate its center of gravity close to the extended centerline of the reciprocable member.

4. The combination specified in claim 2 wherein, a hollow shaft surrounds said main shaft and is rotatable thereon, said first contraweight is attached to said hollow shaft and is rotatable therewith, a second smaller contraweight is also attached to said hollow shaft and is rotatable therewith, said smaller contraweight is located diametrically opposite said first contraweight and is axially spaced therefrom, and said two contraweights plus said main counterweight serve to counterbalance the primary reciprocating inertia force of said reciprocable member.

5. The combination specified in claim 4 wherein at least a portion of said first contraweight overlaps said main counterweight such that both the main counterweight and the first contraweight rotate in a common plane perpendicular to the axis of rotation of said crankshaft, and the purpose of constructing said first contraweight as just specified is to locate its center of gravity closer to said reciprocable member and thereby reduce the required moment of both of said contraweights.

6. In a reciprocating machine, the combination of a frame structure, a reciprocable member guided for reciprocation relative to said frame structure, a crankshaft mounted for rotation in said frame structure, said crankshaft having a center throw crank with a main shaft on each side of the crank, said center throw crank having two crank arms and a crank pin, a connecting rod interconnecting said crankpin and said reciprocable member for respective rotary and reciprocative motion, at least one main counterweight attached to said crankshaft and rotatable therewith, a first contraweight mounted for rotation around one of said main shafts, a second contraweight mounted for rotation around the second main shaft, said two contraweights being adapted to rotate in the opposite direction from that of said crankshaft and at equal RPM to that of the crankshaft, said main counterweight and said two contraweights combining so as to counterbalance the reciprocating primary inertia force of said reciprocable member, a first countershaft mounted for rotation offset from said crankshaft, and wherein the improvement comprises, a first larger gear attached to a said mainshaft and rotatable therewith, a first pinion gear attached to said first countershaft and rotatable therewith, said first larger gear meshing with said first pinion gear so as to drive said first countershaft at twice the RPM of said crankshaft, a second countershaft mounted for rotation offset from said crankshaft, a second pinion gear attached to said second countershaft and rotatable therewith, additional pinion gear attached to said first countershaft and rotatable therewith, additional pinion gear attached to said second countershaft and rotatable therewith, said two additional pinion gears meshing directly so as to drive said second countershaft at the same RPM as said first countershaft but in the opposite direction of rotation, a second larger gear attached to said first contraweight and rotatable therewith, said second larger gear meshing with said second pinion gear so as to drive said first contraweight at the same RPM as said crankshaft but in the opposite direction or rotation, a secondary balance weight attached to each of said countershafts and rotatable therewith, said two secondary balance weights serving to counterbalance the secondary reciprocating inertia force of said reciprocable member, said two countershafts thus performing multiple functions which are to rotate said secondary weights and also to serve as a transmission and reverser for driving said first contraweight in the opposite direction of rotation from that of the crankshaft, a third pinion gear attached to the other end of said second countershaft and rotatable therewith, a third larger gear attached to said second contraweight and rotatable therewith, said third pinion gear meshing with said third larger gear so as to drive said second contraweight at the same RPM as said crankshaft but in the opposite direction of rotation and said second countershaft thus also serving as a driveshaft for driving said second contraweight.

7. The combina;tion specified in claim 2 wherein: said two countershafts (37 and 38) are spaced substantially equidistant from the axis of said crankshaft (21); said first larger gear (40) is substantially coaxial with said second larger gear (32), said pinion gear (41) on the first countershaft (38) is wide enough so as to extend beyond said first larger gear (40), said pinion gear (42) on said second countershart (37) is axially spaced from said first larger gear (40) so as to prevent tooth lockup, said pinion gear (41) on the first countershaft (38) is axially spaced from said second larger gear (32) so as to prevent tooth lockup, said pinion gear (41) is wide enough so as to mesh with both the first larger gear (40) and the pinion gear (42), and said pinion gear (42) is wide enough so as to mesh with both the second larger gear (32) and the pinion gear (41).

* * * * *